United States Patent
Abramson et al.

(10) Patent No.: US 7,864,761 B2
(45) Date of Patent: Jan. 4, 2011

(54) HANDLING UNSOLICITED CONTENT AT A TELECOMMUNICATIONS TERMINAL

(75) Inventors: Sandra R. Abramson, Freehold, NJ (US); Vincent A. Illuzzi, Toms River, NJ (US); Jatin Patel, Union City, NJ (US); Rituraj Sinha, West Orange, NJ (US); John W. Soltes, Ocean Township, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1259 days.

(21) Appl. No.: 11/051,732

(22) Filed: Feb. 4, 2005

(65) Prior Publication Data

US 2006/0176833 A1 Aug. 10, 2006

(51) Int. Cl.
*H04L 12/56* (2006.01)
(52) U.S. Cl. .................. 370/389; 709/206; 709/219; 455/419; 455/466; 455/550.1; 713/170; 726/23
(58) Field of Classification Search .................. 370/312, 370/349, 390, 432, 471, 352, 389; 726/22–25; 709/219, 245, 246, 206, 238, 227; 713/153, 713/161, 170; 455/550.1, 433, 466, 419, 455/463, 414.1
See application file for complete search history.

(56) References Cited

U.S. PATENT DOCUMENTS

| | | | | |
|---|---|---|---|---|
| 6,157,946 A * | 12/2000 | Itakura et al. | ............... | 709/217 |
| 6,336,137 B1 * | 1/2002 | Lee et al. | .................... | 709/219 |
| 6,381,645 B1 * | 4/2002 | Sassin | ......................... | 709/227 |
| 6,501,956 B1 * | 12/2002 | Weeren et al. | .............. | 455/463 |
| 6,546,247 B1 * | 4/2003 | Foti et al. | ................... | 455/433 |
| 6,745,333 B1 | 6/2004 | Thomsen | | |
| 6,834,102 B2 | 12/2004 | Sawada et al. | | |
| 6,912,571 B1 * | 6/2005 | Serena | ....................... | 709/224 |
| 7,039,386 B2 * | 5/2006 | Kolsrud | .................... | 455/404.1 |
| 7,467,190 B2 * | 12/2008 | Matsubara et al. | .......... | 709/219 |
| 2001/0014085 A1 * | 8/2001 | Johansson et al. | ........... | 370/329 |
| 2002/0052185 A1 * | 5/2002 | O'Hagan et al. | .............. | 455/90 |
| 2002/0123335 A1 * | 9/2002 | Luna et al. | .................. | 455/419 |

(Continued)

FOREIGN PATENT DOCUMENTS

WO 2005046111 5/2005

OTHER PUBLICATIONS

Lee, P.Y.; Hui, S.C.; Fong, A.C.M., "Neural networks for web content filtering," Intelligent Systems, IEEE , vol. 17, No. 5, pp. 48-57, Sep./Oct. 2002.*

(Continued)

*Primary Examiner*—Aung S Moe
*Assistant Examiner*—Jeffrey M Rutkowski
(74) *Attorney, Agent, or Firm*—DeMont & Breyer, LLC (57) ABSTRACT

A method and apparatus are disclosed that enable a telecommunications terminal to securely receive unsolicited content from applications that are external to the terminal. In particular, the present invention enables the terminal to control the interaction with external applications by using a secure, two-task process. In the two-task process of the present invention, the execution of the second task is based on verifying the trustworthiness of address information that is provided in the first task. This is in contrast to a one-task process, in which an untrustworthy server that provides content might hide its own address by substituting a legitimate address.

14 Claims, 10 Drawing Sheets

U.S. PATENT DOCUMENTS

| | | | |
|---|---|---|---|
| 2003/0078980 A1* | 4/2003 | Carstens et al. | 709/206 |
| 2003/0097444 A1* | 5/2003 | Dutta et al. | 709/225 |
| 2003/0101246 A1* | 5/2003 | Lahti | 709/221 |
| 2003/0140254 A1 | 7/2003 | Bouthors | |
| 2003/0186686 A1* | 10/2003 | Yang et al. | 455/414.1 |
| 2003/0200267 A1 | 10/2003 | Garrigues | |
| 2004/0105121 A1 | 6/2004 | Taniguchi et al. | |
| 2005/0083929 A1* | 4/2005 | Salo et al. | 370/389 |
| 2005/0097177 A1* | 5/2005 | McUmber et al. | 709/206 |
| 2006/0146740 A1* | 7/2006 | Sheynman et al. | 370/312 |
| 2006/0178155 A1* | 8/2006 | Abramson et al. | 455/466 |
| 2007/0047523 A1* | 3/2007 | Jiang | 370/352 |
| 2007/0203997 A1* | 8/2007 | Ingerman et al. | 709/206 |
| 2007/0299915 A1* | 12/2007 | Shraim et al. | 709/206 |
| 2008/0046528 A1* | 2/2008 | Gilhuly et al. | 709/206 |

OTHER PUBLICATIONS

Davies, Steven, "GB Application No. GB0602030.9 Office Action Dec. 21, 2006", , Publisher: UK IPO, Published in: GB.

Davies, Steven, "GB Application No. GB0602030.9 Search Report Apr. 28, 2006", , Publisher: UK IPO, Published in: GB.

Leitner, Gerhard, "DE Application No. 10 2005 062 332.8-31 Office Action Nov. 30, 2009", , Publisher: DPMA, Published in: DE.

\* cited by examiner

HANDLING UNSOLICITED CONTENT AT A TELECOMMUNICATIONS TERMINAL

FIELD OF THE INVENTION

The present invention relates to telecommunications in general, and, more particularly, to handling a received message based on verifying the trustworthiness of information contained in the message.

BACKGROUND OF THE INVENTION

Figure 1:
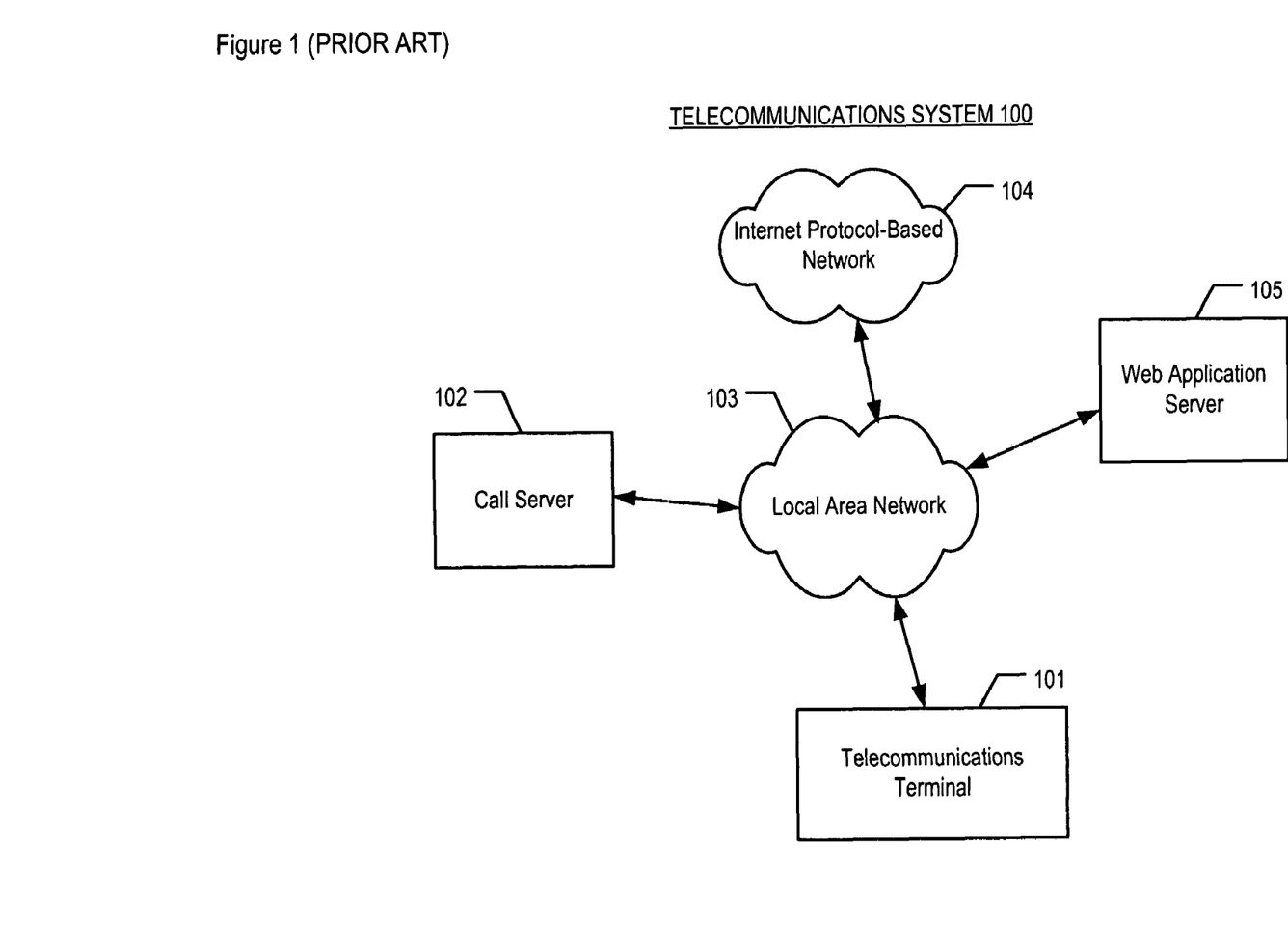
FIG. 1 depicts a block diagram of telecommunications system 100 in the prior art.

FIG. 1 depicts a block diagram of telecommunications system 100 in the prior art. Telecommunications system 100 comprises telecommunications terminal 101, call server 102, local area network 103, internet protocol-based network 104, and web application server 105, interconnected as shown.

Telecommunications terminal 101 is capable of transmitting and receiving signals as part of a call on behalf of its user. It interacts with call server 102 to place outgoing calls and to receive incoming calls. Terminal 101 transmits via local area network 103 call-related traffic in packet format to one or more destinations, such as devices that are associated with Internet Protocol-based network 104. Terminal 101 also receives via local area network 103 call-related traffic in packet format from one or more sources, such as from devices that are associated with Internet Protocol-based network 104. Terminal 101 communicates by using the Internet Protocol set of rules and, as such, is an Internet Protocol-based telephone.

Terminal 101 is also capable of receiving and displaying Internet Protocol-based content, such as text and graphics, on a built-in display screen and by using a built-in browser. The user of terminal 101 uses the browser to request and display content, such as text and graphics, similarly to how a user of a personal computer uses the computer's browser (e.g., Internet Explorer™, Netscape Communicator™, etc.) to display content on the computer's screen. The user of terminal 101 requests the content by selecting objects on the display screen, which causes terminal 101 to transmit a request message to the source of the content, such as web application server 105. Subsequently, terminal 101 receives a message that contains the content, and the content is then displayed on the display screen.

The browser capability in terminal 101 is useful, in that it enables its user to navigate web applications, including information about the company, news, interactive applications (e.g., a conference room scheduler, etc.), company directory lookup, and so forth. It is the user who determines when to retrieve content; for example, if a call is in progress, the user will typically request content when the content will enhance the call or at a later time so as not to interfere with the call.

Some telecommunications terminals also have a rudimentary capability to receive content that is "pushed" to the terminals by applications that are external to the terminals. An advantage of a pushed application is that an external application can determine the content that is sent to the user without relying on the user requesting the content. A disadvantage is that content that has not been solicited by the terminal might contain unwanted elements (e.g., viruses, etc.) and, consequently, cannot be implicitly trusted.

What is needed is a technique to receive unsolicited content at a telecommunications terminal without some of the disadvantages of the prior art.

SUMMARY OF THE INVENTION

The present invention enables a telecommunications terminal to securely receive unsolicited content from applications that are external to the terminal, without some of the disadvantages of the prior art. For example, the illustrative embodiment enables the terminal to control the interaction with external applications by using a secure, two-part process. In the two-part process of the present invention, the execution of the second part is based on verifying the trustworthiness of address information that is provided in the first part. This is in contrast to a one-part process, in which an untrustworthy server that provides content might hide its own address by substituting a legitimate address.

The two-part process of the illustrative embodiment of present invention is described here. As part of the first part, the telecommunications terminal receives an unsolicited first message that comprises an address from a message initiator (e.g., a software program, a server, etc.). The terminal then determines the trustworthiness of the address. As part of the second part, the terminal requests a second message from the address provided, basing the decision to transmit the request on verifying the trustworthiness of the address. The second message, which is received by the terminal in response to the request, contains the content that the message initiator intended for the user to receive. Moreover, the message initiator and the content server that is associated with the specified address can be two different entities. The two-part process of the illustrative embodiment is analogous to a simple "push-then-pull" operation, but with the advantages of: (i) controlling the information exchange at the terminal itself based on verifying the trustworthiness of an address, and (ii) being able to have two different entities pushing the address and providing the content.

The illustrative embodiment of the present invention enables a secure delivery mechanism for a variety of applications that are external to the terminal, including:
  Broadcasting emergency alerts,
  Broadcasting company news,
  Sending meeting reminders with conference bridge numbers so that users do not have to search for the conference number,
  Streaming music, such as wake-up alarms in hotel rooms,
  Streaming audio announcements, such as alerts to clear an office building,
  Sending critical stock news information,
  Broadcasting critical weather alerts, and
  Building intelligent databases to target information to an individual phone or groups of phones.

In some embodiments, when the content is actually received, to determine what action to take with the content, the terminal can consider (i) the state of the terminal, (ii) the type of content, and (iii) the priority of the content, in accordance with the illustrative embodiment. For example, the audio content of normal priority in a received message would be rejected if the user is already on a call. Audio content of a higher priority (i.e., a "barge-in" such as a building emergency notification), however, would preempt the user on the call.

In some other embodiments, instead of content being user-oriented, such as with audio or text, the content of the second message might itself be another address. This second address, for example, can be that of a subscription server, to which the telecommunications terminal of the illustrative embodiment can send information. In accordance with the illustrative embodiment, the terminal verifies the trustworthiness of the second address in determining whether or not to transmit information.

As an example of the illustrative embodiment of the present invention, a business in an office building located in an area of the United States known as "Tornado Alley" has implemented an emergency warning system for its employees by using their telecommunications terminals. If a tornado is reported to be nearby, the building administrator initiates an official warning message by commanding the message initiator, which operates in the administrator's office computer, to transmit a request message to the telecommunications terminals of the employees, specifying an address where content can be found. The provided address corresponds to a server that has available a tornado report from the National Oceanic and Atmospheric Administration (NOAA) for the geographic area that the office building is in. After verifying the trustworthiness of the provided address—after all, a hoax would impact office productivity and cause unnecessary harm or anxiety—each terminal requests and receives the content, which is an audio stream of high priority, which is then streamed to the users of the terminals, warning them of the tornado. As shown in the example, the illustrative embodiment of the present invention enables the message initiator and the source of the content to be advantageously different, while providing for security.

The illustrative embodiment of the present invention comprises: (1) receiving, from a first source, an unsolicited first message at a telecommunications terminal that instructs the telecommunications terminal to request a second message from an address specified in the first message; and (2) transmitting a request for the second message to the address from the telecommunications terminal only when the trustworthiness of the address can be verified by the telecommunications terminal; wherein the address and the address of the first source are different.

DETAILED DESCRIPTION

Figure 2:
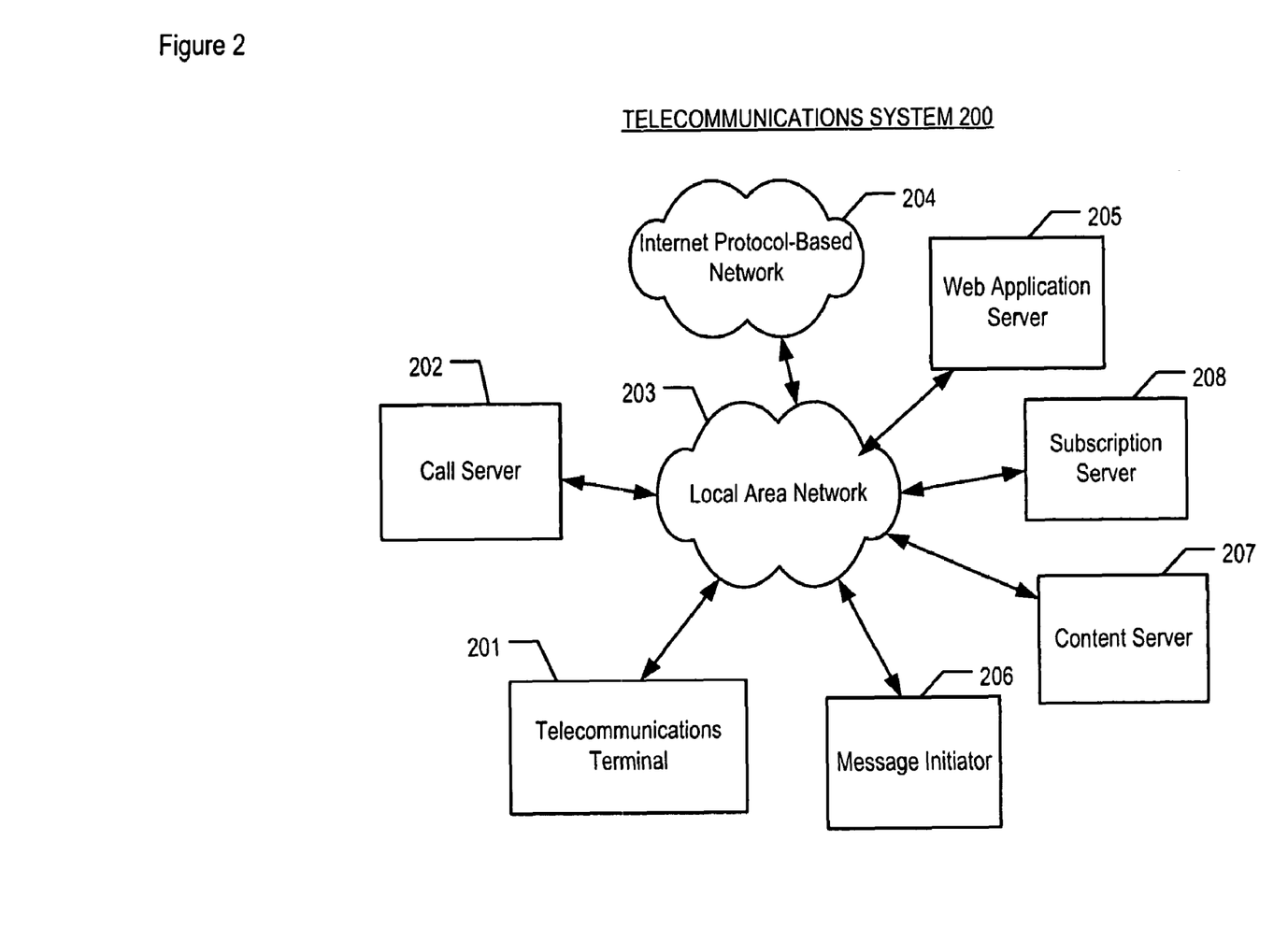
FIG. 2 depicts a block diagram of telecommunications system 200 in accordance with the illustrative embodiment of the present invention.

FIG. 2 depicts a block diagram of telecommunications system 200 in accordance with the illustrative embodiment of the present invention. Telecommunications system 200 comprises telecommunications terminal 201, call server 202, local area network 203, internet protocol-based network 204, web application server 205, message initiator 206, content server 207, and subscription server 208, interconnected as shown.

Figure 3:
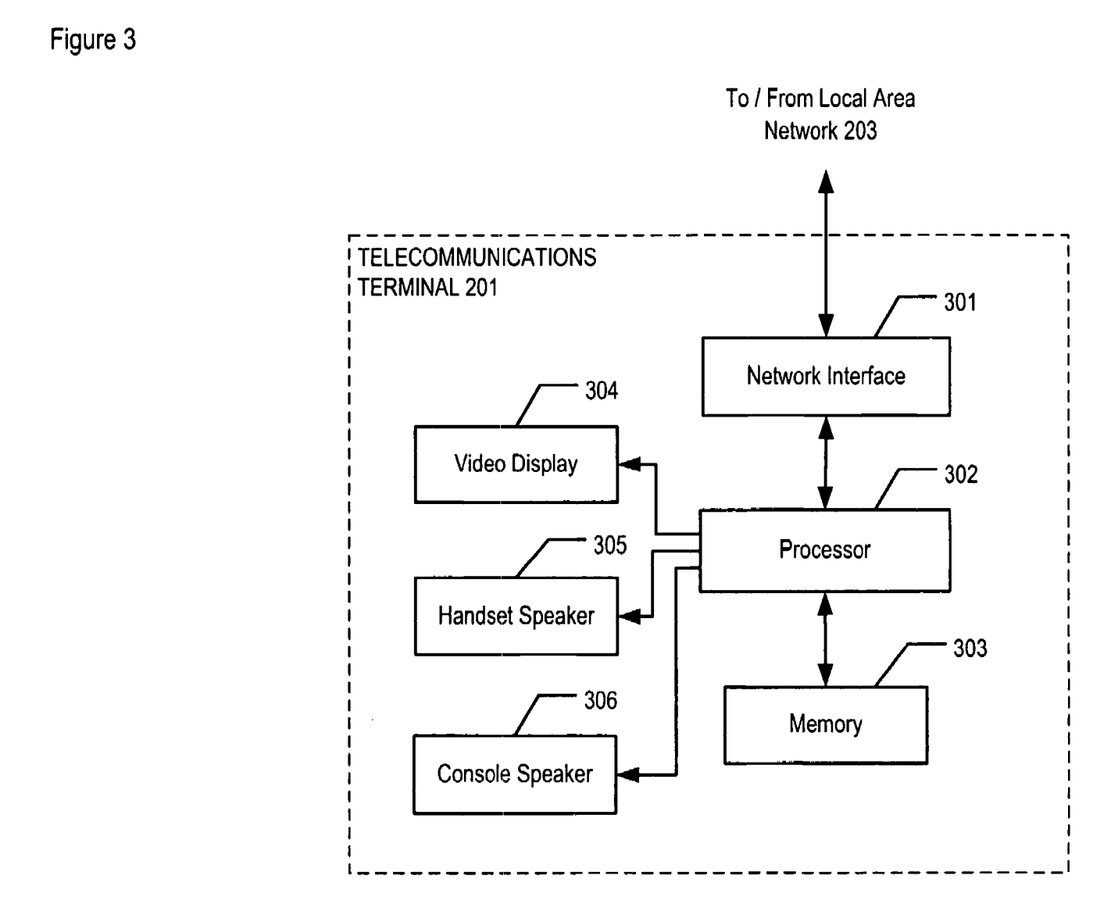
FIG. 3 depicts a block diagram of the salient components of telecommunications terminal 201, in accordance with the illustrative embodiment of the present invention.

Telecommunications terminal 201 is capable of transmitting and receiving signals as part of a call on behalf of its user. Terminal 201 transmits call-related traffic and control information in packet format to one or more destinations via local area network 203, in well-known fashion. Terminal 201 also receives call-related traffic and control information, as well as browser-related information, in packet format from one or more sources via local area network 203, in well-known fashion. In accordance with the illustrative embodiment of the present invention, terminal 201 is an Internet Protocol-based telephone, as is known in the art. In some alternative embodiments, terminal 201 can be another type of packet-based terminal, such as a Session Initiation Protocol-based telephone, as is known in the art. The structure of terminal 201 is depicted in FIG. 3.

Terminal 201's call-handling and browsing abilities are supported by local area network 203, internet protocol-based network 204, and web application server 205, which are equivalent to local are network 103, internet protocol-based network 104, and web application server 105, respectively, and as such will not be described further.

In accordance with the illustrative embodiment, terminal 201 is also capable of exchanging messages with sources of content that is intended for terminal 201's user and with sources of the addresses of where the content can be found. In addition, terminal 201 is capable of outputting the received content to the user via a display, a speaker, or another user-oriented, output device. The tasks that are related to terminal 201's handling of messages for the purpose of retrieving content are described below and with respect to FIGS. 5 through 10.

It will be clear to those skilled in the art, after reading this specification, how to make and use telecommunications terminal 201.

Message initiator 206 is the source of a first message. In accordance with the illustrative embodiment of the present invention, message initiator 206 is an application server that specifies in the first message a first address at which content can be found. In some alternative embodiments, message initiator 206 can be a software procedure (e.g., a program that runs on a shared server, etc.), the personal computer of terminal 201's user, and so forth. Message initiator 206 is capable of transmitting a first message that specifies the first address to telecommunications terminal 201 and receiving response messages from terminal 201.

Message initiator 206 might intend for only terminal 201 to request content at the first address. Alternatively, message initiator 206 might intend for multiple telecommunications terminals to request content at the same address, in which case message initiator 206 transmits the first message to a first terminal (e.g., terminal 201, etc.), the first message to a second terminal, and so on.

It will be clear to those skilled in the art how to make and use message initiator 206.

Content server 207 is a standalone server that is capable of providing content, in accordance with the illustrative embodiment of the present invention. In some alternative embodiments, content server 207 can be an existing web server (i.e., different from message initiator 206) within local area network 203 or the same server as message initiator 206. Content server 207, which corresponds to the first address provided to terminal 201 by message initiator 206, is capable of receiving a request message from terminal 201. Content server 207 is capable of transmitting one or more messages that comprise content to terminal 201. It will be clear to those skilled in the art how to make and use content server 207.

Subscription server 208 is a server that is capable of receiving terminal-related information in a subscribe transaction from telecommunications terminal 201. The subscription information comprises one or more of (i) the Internet Protocol address of terminal 201, (ii) the telephone extension of terminal 201's user, (iii) the set identifier of terminal 201 (e.g., make and model number, etc.), and (iv) the Medium Access Control (or "MAC") address of terminal 201. Subscription server 208 is used, for example, so that an intelligent application can get terminal 201's information from an external database without having to query terminal 201 (i.e., the target terminal of the application). It will be clear to those skilled in the art how to make and use subscription server 208.

Even though message initiator 206, content server 207, and subscription server 208 are depicted in FIG. 2 to be within local area network 203, one or more of elements 206, 207, and 208 can be situated outside of local area network 203, as those who are skilled in the art will appreciate. For example, message initiator 206 might be situated within a local area network of a hotel, but content server 207 might be maintained by an outside information service provider that is employed by the hotel and accessible through the Internet (i.e., is not within the hotel's local area network).

FIG. 3 depicts a block diagram of the salient components of telecommunications terminal 201, in accordance with the illustrative embodiment of the present invention. Telecommunications terminal 201 comprises network interface 301, processor 302, memory 303, video display 304, handset speaker 305, and console speaker 306, interconnected as shown.

Network interface 301 comprises a receiving part and a transmitting part. The receiving part receives signals from local area network 203, and forwards the information encoded in the signals to processor 302, in well-known fashion. The transmitting part receives information from processor 302, and outputs signals that encode this information to local area network 203, in well-known fashion. It will be clear to those skilled in the art how to make and use network interface 301.

Processor 302 is a general-purpose processor that is capable of: receiving information from network interface 301; reading data from and writing data into memory 303; executing the tasks described below and with respect to FIGS. 5 through 10; and transmitting information to network interface 301, video display 304, handset speaker 305, and console speaker 306. In some alternative embodiments of the present invention, processor 302 might be a special-purpose processor. In either case, it will be clear to those skilled in the art, after reading this specification, how to make and use processor 302.

Memory 303 stores data and executable instructions, in well-known fashion, and is a combination of volatile and non-volatile memory. It will be clear to those skilled in the art, after reading this specification, how to make and use memory 303.

Video display 304 is a display output device as is well-known in the art that receives a video signal and creates a visual image of the signal for a user. It will be clear to those skilled in the art how to make and use video display 304.

Handset speaker 305 is an electro-acoustic transducer output device as is well known in the art that is situated in the handset of terminal 201 and that receives a speaker signal and creates an audible sound of the signal for a user. It will be clear to those skilled in the art how to make and use handset speaker 305.

Console speaker 306 is an electro-acoustic transducer output device as is well known in the art that is situated in the console (i.e., base part) of terminal 201 and that receives a speaker signal and creates an audible sound of the signal for a user. Console speaker 306 is used, for example, when terminal 201 is operated in "speakerphone" mode. It will be clear to those skilled in the art how to make and use handset speaker 306.

Figure 4:
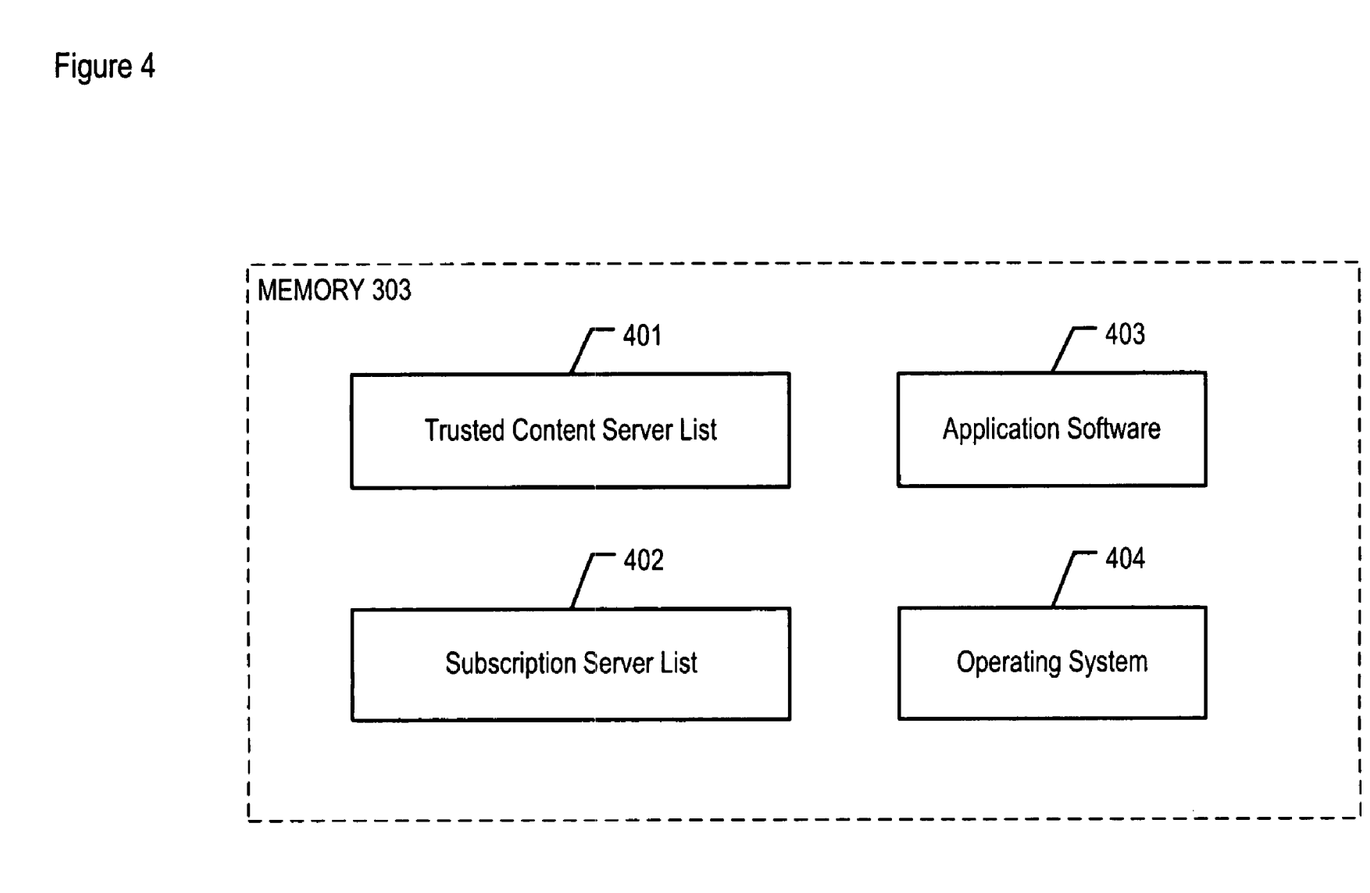
FIG. 4 is a block diagram of how information is stored and organized in memory 303, in accordance with the illustrative embodiment of the present invention.

FIG. 4 is a block diagram of how information is stored and organized in memory 303, in accordance with the illustrative embodiment of the present invention. The information stored in memory 303 comprises trusted content server list 401, subscription server list 402, application software 403, and operating system 404. As will be appreciated by those skilled in the art, the information that is stored in memory 303 can be organized differently than what is depicted in FIG. 4.

Trusted content server list 401 is a list of servers that have been identified as trusted sources of content. List 401 is used to determine the trustworthiness of a received address, in accordance with the illustrative embodiment of the present invention. The address of each trusted server on the list, in accordance with the illustrative embodiment, is identified with a validation string in the form of a uniform resource identifier (URI), as is well-known in the art. Each URI string comprises part or all of a domain (e.g., "www.example.com", etc.), part or all of a path (e.g., "/push", etc.), or a combination of the two (e.g., "www.example.com/push", etc.) As those who are skilled in the art will appreciate, there are alternative ways to identify one or more servers on trusted content server list 401.

Subscription server list 402 is a list of servers that have been identified as trusted servers to which to transmit subscription information. The address of each subscription server on the list, in accordance with the illustrative embodiment, is identified with a validation string in the format of a uniform resource identifier (URI), as is well-known in the art. Some examples of subscription server URIs are "http://10.0.1.101/subscribe.asp", "http://company.com/subscribe/", and so forth. As those who are skilled in the art will appreciate, there are alternative ways to identify one or more servers on subscription server list 402.

Application software 403 is the software portion of the system described below and with respect to FIGS. 5 through 10. Operating system 404 is an operating system, in well-known fashion, that performs input/output, file and memory management, and all of the other functions normally associated with operating systems. It will be clear to those skilled in the art how to make and use operating system 404.

Figure 5:
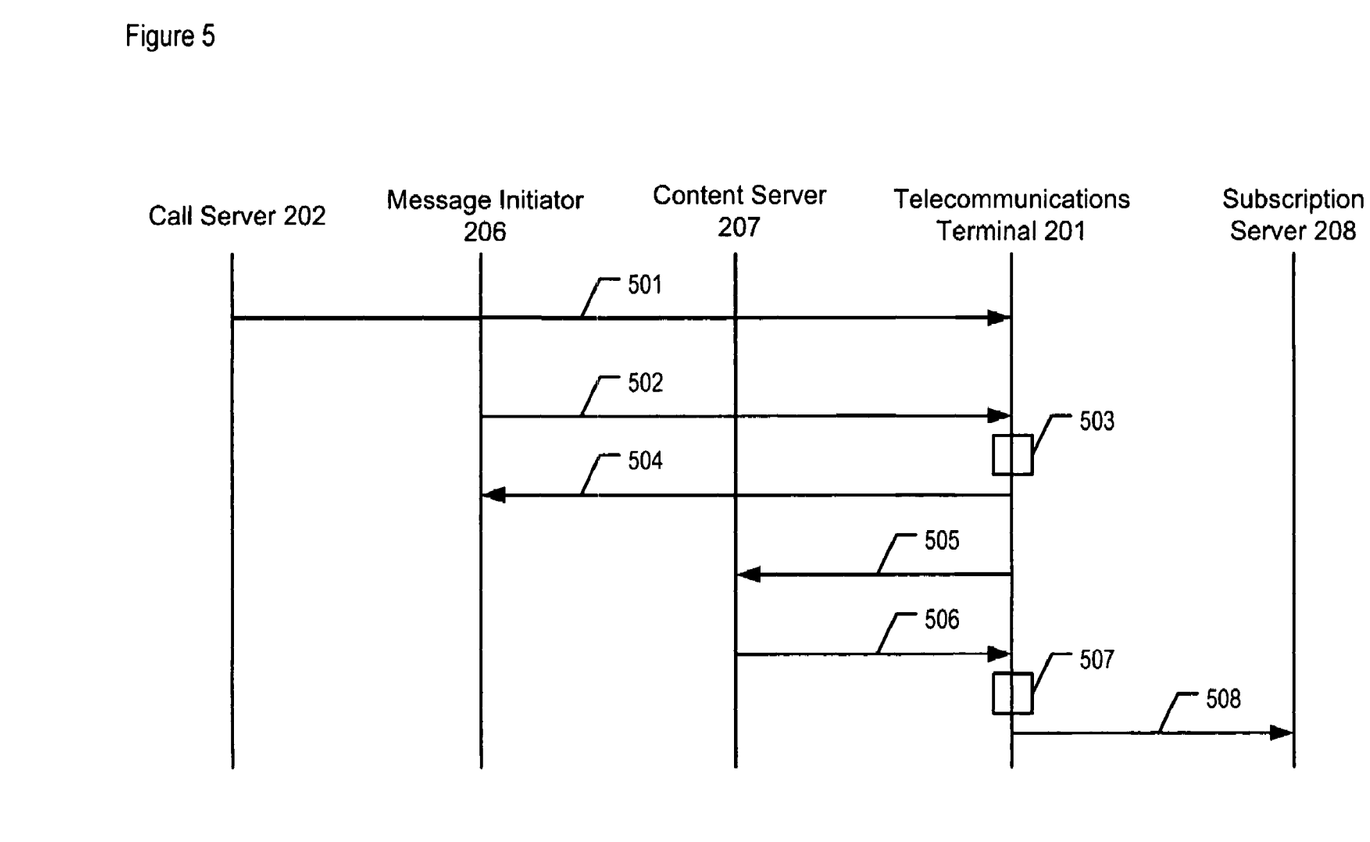
FIG. 5 depicts a message flow diagram of the salient events associated with handling unsolicited content, in accordance with the illustrative embodiment of the present invention.

FIG. 5 depicts a message flow diagram of the salient events associated with handling unsolicited content, in accordance with the illustrative embodiment of the present invention. It will be clear to those skilled in the art which events depicted in FIG. 5 can occur simultaneously or in a different order than that depicted.

In accordance with the illustrative embodiment, telecommunications terminal 201 exchanges messages with call server 202, message initiator 206, content server 207, and subscription server 208 by using files in Extensible Markup Language (XML), as is known in the art, and by using Hypertext Transfer Protocol (HTTP)-based rules, as known in the art. As those who are skilled in the art will appreciate, other languages (e.g., Wireless Markup Language [WML], etc.) and transfer rules (e.g., Session Initiation Protocol [SIP]-based, etc.) can be used for the purposes of exchanging messages in telecommunication system 200.

At event 501, call server 202 transmits a trusted content server list and a subscription server list to telecommunications terminal 201, in accordance with the illustrative embodiment. In some alternative embodiments, a different server transmits the server lists. In some embodiments, the lists are transmitted in response to having received a boot up signal from terminal 201, such as when terminal 201 is initially connected to local area network 203. Terminal 201 stores the lists in memory 303 as trusted content server list 401 and subscription server list 402.

At event 502, message initiator 206 transmits to telecommunications terminal 201 a first message in well-known fashion. The first message comprises a first address and instructs terminal 201 to request a second message from a content server (e.g., content server 207, etc.). This is analogous to receiving a push request as part of a push transaction, in which an initiator of a push instructs a client to request a message that contains push content from an address specified by the push initiator.

At task 503, telecommunications terminal 201 determines whether to accept or reject the received first message, in accordance with the illustrative embodiment of the present invention. The subtasks that make up task 503 are described below and with respect to FIG. 6.

At event 504, telecommunications terminal 201 transmits a response message back to message initiator 206 in well-known fashion. The response message indicates whether the received first message has been accepted or rejected.

At event 505, once telecommunications terminal 201 accepts the received first message, terminal 201 transmits a request to the first address received in the first message. The address corresponds to a content server (e.g., content server 207, etc.). This is analogous to a client requesting content as part of a push transaction, in which the address of the requested content was specified in a push request made earlier by the initiator of the push.

At event 506, content server 207 transmits a second message, with one or more portions of which representing the requested content, back to telecommunications terminal 201.

At task 507, telecommunications terminal 201 determines whether or not to output the received content to the designated output device or devices. The subtasks that make up task 506 with regards to outputting the received content are described below and with respect to FIG. 7. Also at event 507, the portion or portions of content are sent to the designated output device or devices, if so determined.

At event 507, telecommunications terminal 201 also determines, based on the received content, whether or not to transmit subscription information to a subscription server (e.g., subscription server 208, etc.). In this scenario, the received content comprises a second address that corresponds to the subscription server. The subtasks that make up task 506 with regards to transmitting subscription information are described below and with respect to FIG. 10.

At event 508, telecommunications terminal 201 optionally transmits subscription information to subscription server 208, if so determined.

Figure 6:
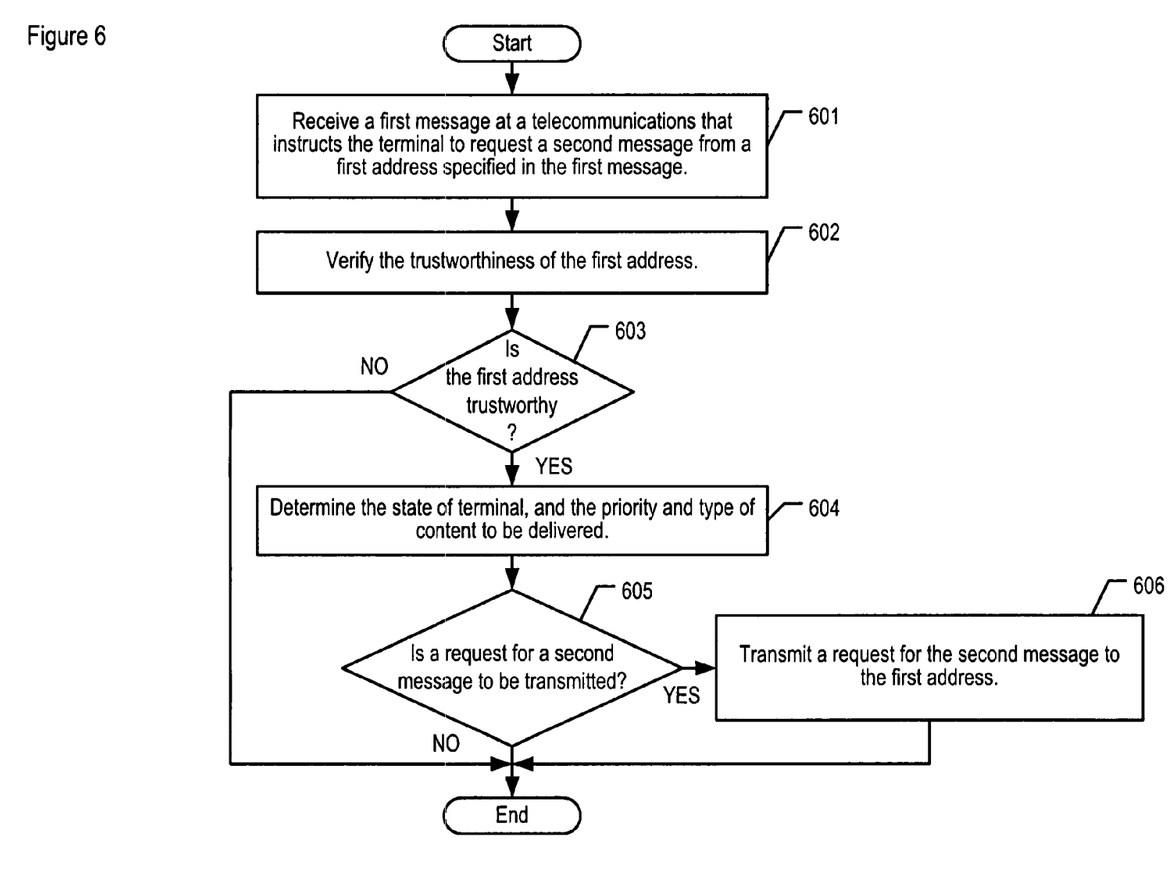
FIG. 6 depicts a flowchart of the salient tasks associated with determining whether or not to transmit a request for a second message, in accordance with the illustrative embodiment of the present invention.

FIG. 6 depicts a flowchart of the salient tasks associated with determining whether or not to transmit a request for a second message, in accordance with the illustrative embodiment of the present invention. It will be clear to those skilled in the art which tasks depicted in FIG. 6 can occur simultaneously or in a different order than that depicted.

At task 601, terminal 201 receives a first message from message initiator 206. The first message (i) comprises a first address (e.g., a source of content or other information, etc.) and (ii) instructs terminal 201 to request a second message from the address provided. In some embodiments, the first message also comprises (i) the type of content available at the first address, (ii) the priority of that content, and (iii) other information useful to terminal 201 (e.g., commands to alert the user of incoming content, etc.).

At task 602, terminal 201 verifies the trustworthiness of the first address received at task 601. In accordance with the illustrative embodiment of the present invention, terminal 201 compares the received first address, which is a URI string, with the validation strings stored in trusted content server list 401. It will be clear to those skilled in the art how to match the received URI string against one or more validation strings.

In some alternative embodiments, terminal 201 verifies the trustworthiness of the first address received at task 601 through other means (e.g., by receiving and determining the validity of a name and password, etc.).

In some other alternative embodiments, terminal 201 verifies the trustworthiness of the first address by comparing both (i) the first address and (ii) the address of message initiator 206 with the list of valid addresses in trusted content server list 401.

At task 603, terminal 201 acts on the outcome of task 602. If the first address is not trustworthy, task execution ends. If it is trustworthy, execution proceeds to task 604.

In some embodiments, terminal 201 transmits a response back to message initiator 206 if the first address was not trustworthy, indicating that the first message has been rejected and the reason for the rejection. Task execution then ends.

At task 604, terminal 201 determines its state. The state of terminal 201 is determined by, but is not limited to, user-driven states, data states, and call states. User-driven states include editing a screen and text entry. Data states include terminal-initiated file backups and so forth. Call states include idle, incoming call, and call-in-progress. It will be clear to those skilled in the art how to determine the state of terminal 201.

Terminal 201 also notes the priority and the type of the content to be received in the second message, in accordance with the illustrative embodiment. The priority and type are specified in the first message sent by message initiator 206. Priority can be specified as "low", "medium", and "high", or as "normal" and "emergency" (i.e., "barge-in"), or as some other set of priority levels. Some examples of content types are single-line text, full-screen text, text and graphics, audio, a second address, and so forth.

At task 605, terminal 201 determines if the determined state of terminal 201, content priority, and content type allow a second message to be requested of content server 207. If not, task execution ends. If the state allows a second message to be requested, execution proceeds to task 606.

In some embodiments, terminal 201 transmits a response back to message initiator 206 if the second message is not to be sent, indicating that the first message has been rejected and the reason.

A first example of how state, priority, and type are used in accordance with the illustrative embodiment is presented here, in which the priority is "normal" and the content type is "text string". When terminal 201 is in a state in which (i) the user is in text entry mode, (ii) terminal 201 is restoring a retrieved backup file, or (iii) terminal 201 has initiated a local procedure, then the first message from message initiator 206 is rejected. Otherwise, the first message is accepted and acted upon (i.e., terminal 201 requests the second message).

In a second example in accordance with the illustrative embodiment, the priority is "barge-in" and the content type is "text string". When terminal 201 is in a state in which (i) terminal 201 is restoring a retrieved backup file or (ii) terminal 201 has initiated a local procedure, then the first message from message initiator 206 is rejected. Otherwise, the first message is accepted and acted upon. In other words, a "barge-in" priority can preempt a user in text entry mode, with the rationale that the barge-in content (e.g., an emergency message to one or more users, etc.) is higher in priority than other content.

In a third example in accordance with the illustrative embodiment, the priority is "normal" and the content type is "audio". When terminal 201 is in a state in which (i) terminal 201's ringer is active, (ii) any call appearance is active, (iii) terminal 201 is restoring a retrieved backup file, (iv) terminal 201 has initiated a local procedure, or (v) terminal 201 is already broadcasting previously-received audio content, then the first message from message initiator 206 is rejected. Otherwise, the first message is accepted and acted upon. In other words, audio content—that is, of "normal" priority—will not interfere with the user on an active call (i.e., when a call appearance is active) or when the user is already receiving other audio content.

In some alternative embodiments, terminal 201 uses combinations of rules that are different than those provided in the examples described above. In some other alternative embodiments, terminal 201 bases the decision to transmit the request for the second message on a subset of terminal state, content priority, and content type.

At task 606, terminal 201 transmits a request for a second message to the first address received at task 601. In some embodiments, terminal 201 also transmits a response back to message initiator 206, indicating that the first message has been accepted. Task execution then ends.

Figure 7:
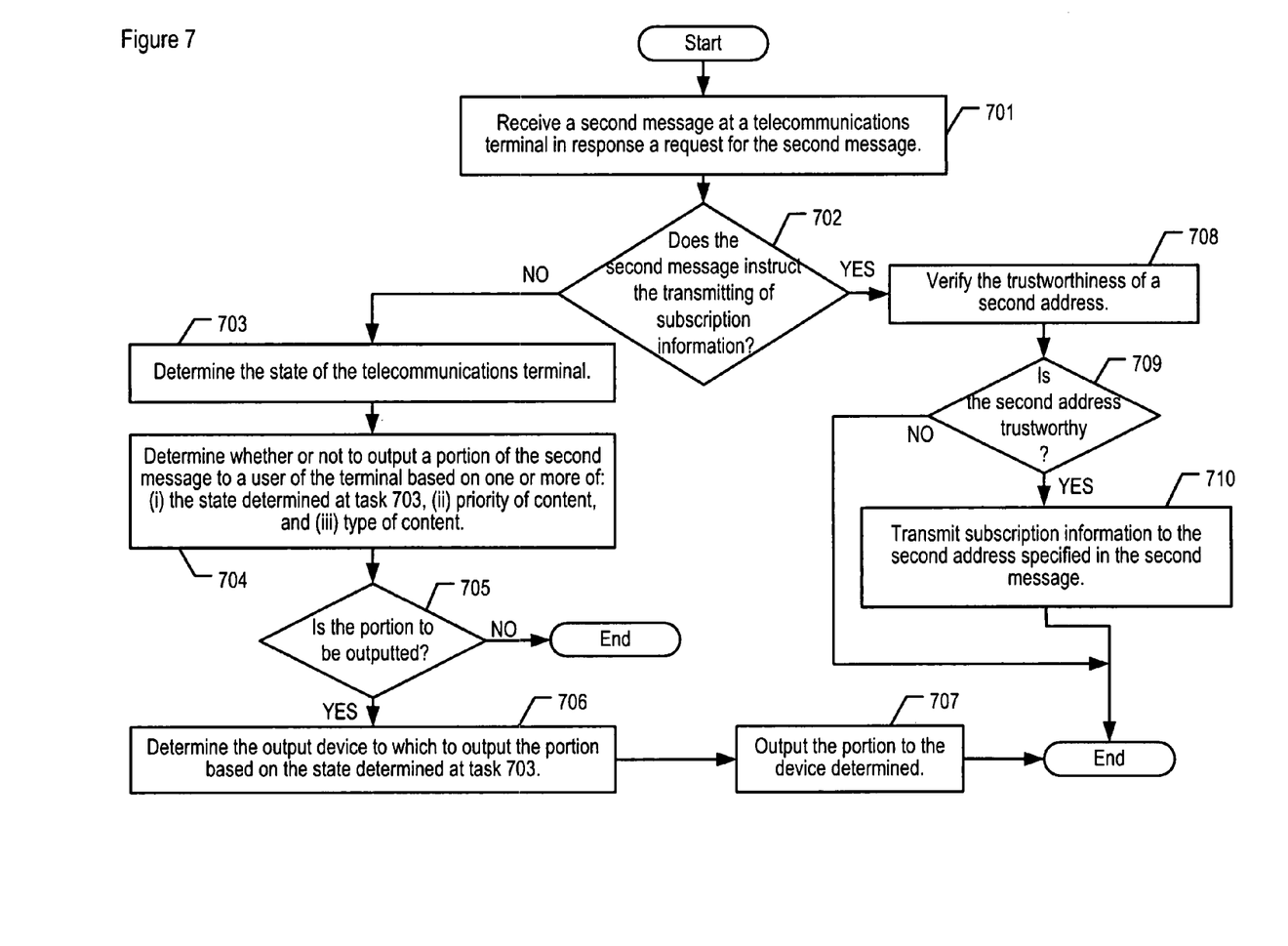
FIG. 7 depicts a flowchart of the salient tasks associated with determining how to handle a received second message, in accordance with the illustrative embodiment of the present invention.

FIG. 7 depicts a flowchart of the salient tasks associated with determining how to handle a received second message, in accordance with the illustrative embodiment of the present invention. It will be clear to those skilled in the art which tasks depicted in FIG. 7 can occur simultaneously or in a different order than that depicted.

At task 701, terminal 201 receives a second message from content server 207. The second message comprises content or other information that is requested by terminal 201 by using the first address provided by message initiator 206. Content can be one or more of single-line text, full-screen text, text and graphics, audio, a second address (e.g., of a subscription server such as server 208, etc.), and so forth.

At task 702, terminal 201 examines the content type provided in the first message by message initiator 206. In alternative embodiments, terminal 201 can examine the second message to determine the content type. Terminal 201 decides whether the content type is related to transmitting subscription information or related to outputting information to terminal 201's user. If the transaction is related to transmitting subscription information (i.e., the second message instructs the transmitting of subscription information), task execution proceeds to task 708. If the transaction is related to outputting information to the user, task execution proceeds to task 703.

At task 703, terminal 201 determines its state. The state of terminal 201 is determined by, but is not limited to, user-driven states, data states, and call states. User-driven states include editing a screen and text entry. Data states include terminal-initiated file backups and so forth. Call states include idle, incoming call, and call-in-progress. It will be clear to those skilled in the art how to determine the state of terminal 201.

At task 704, terminal 201 determines whether or not to output the portion of received content to the user of terminal 201 based on the state determined at task 703, in accordance with the illustrative embodiment. The current state of terminal 201 (i.e., determined at task 703) is considered instead of the earlier-determined state (i.e., at task 604) because the terminal's state might have changed in the interim. Terminal 201 also bases the decision to output the portion on the priority and the type of the content, in accordance with the illustrative embodiment. Priority and type, along with examples, are described above and with respect to tasks 604 and 605.

In some alternative embodiments, terminal 201 bases the decision to output the portion of received content to the user on a subset of terminal state, content priority, and content type.

At task 705, if terminal 201 determines not to output the portion, task execution ends. If terminal 201 determines that it will output the portion, execution proceeds to task 706.

At task 706, terminal 201 optionally determines the output device to which to output the received content. For example, terminal 201 might direct an audio stream to handset speaker 305 and console speaker 306 if the content is of high priority (e.g., a priority associated with an emergency situation, etc.) or to handset speaker 305 if the content is of normal priority and the handset is off-hook (but the user is not yet on a call).

At task 707, terminal 201 outputs the portion of content to the specified or selected device or devices. After task 707, task execution ends.

At task 708, terminal 201 verifies the trustworthiness of a second address received in the second message at task 701. In accordance with the illustrative embodiment of the present invention, terminal 201 compares the received second address, which is a URI string, with the validation strings stored in subscription server list 402. It will be clear to those skilled in the art how to match the received URI string against one or more validation strings.

In some alternative embodiments, terminal 201 verifies the trustworthiness of the second address received at task 701 through other means (e.g., by receiving and determining the validity of a name and password, etc.).

In some other alternative embodiments, terminal 201 verifies the trustworthiness of the second address by:

(i) comparing the first address with the list of valid addresses in trusted content server list 401, or (ii) comparing both: (a) the first address with the list of valid addresses in trusted content server list 401, and (b) the second address with the list of valid addresses in subscription server list 402.

At task 709, terminal 201 acts on the outcome of task 708. If the second address is not trustworthy, task execution ends. If it is trustworthy, execution proceeds to task 710.

At task 710, terminal 201 transmits its subscription information to the second address (e.g., that of subscription server 208, etc.), specified in the received second message. Task execution then ends.

Figure 8A:
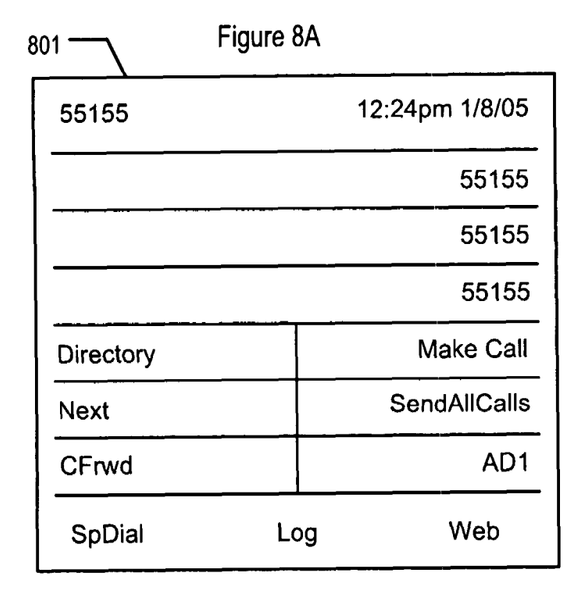
FIGS. 8A and 8B depict a first example of a displayed portion of the received second message, in accordance with the illustrative embodiment of the present invention.
Figure 8B:
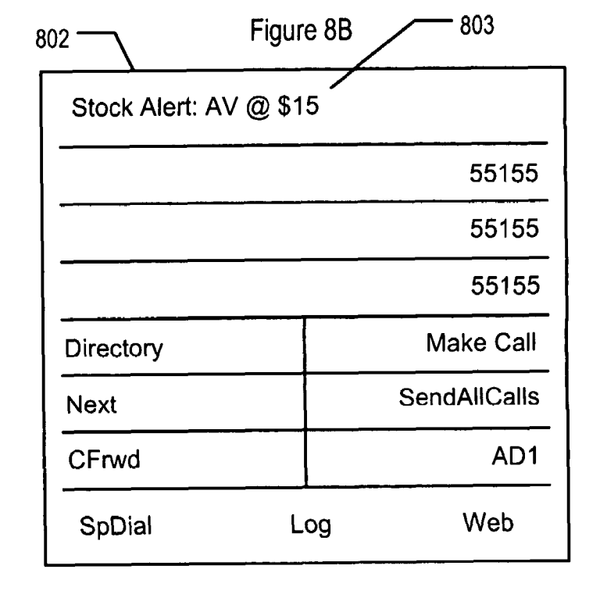

FIGS. 8A and 8B depict a first example of a displayed portion of the received second message, in accordance with the illustrative embodiment of the present invention. In FIG. 8A, screen shot 801 represents the default screen as displayed by video display 304. When terminal 201 receives from content server 207 the second message where a portion of which represents a single line of text, terminal 201 determines, based on state and so forth, whether or not to output the single line of content. Screen shot 802, which is depicted in FIG. 8B, represents a screen in which single-line content 803 has been output to video display 304 as part of task 707.

Figures 9, 9A:
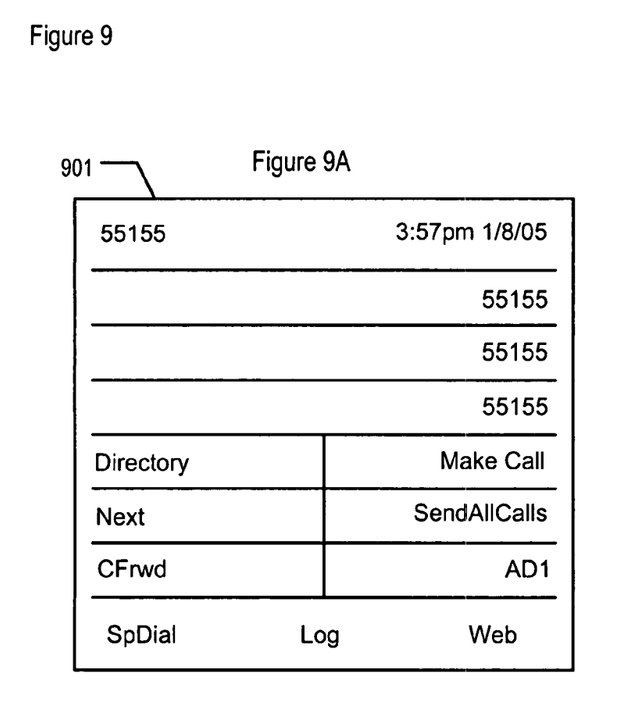
FIGS. 9A and 9B depict a second example of a displayed portion of the received second message, in accordance with the illustrative embodiment of the present invention.
Figure 9B:
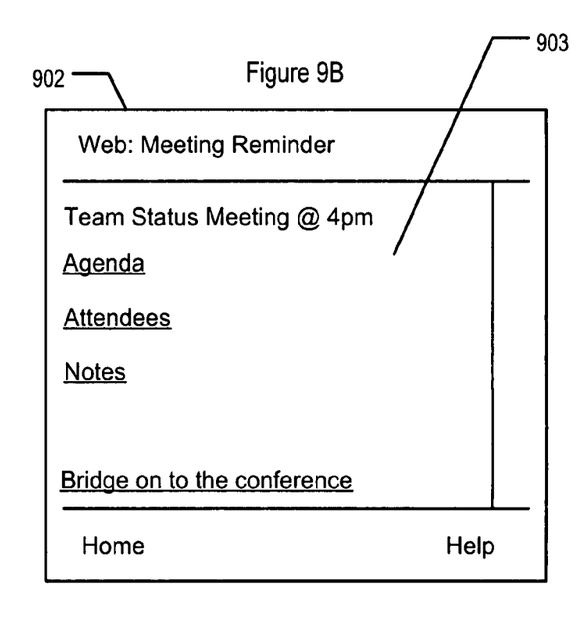

FIGS. 9A and 9B depict a second example of a displayed portion of the received second message, in accordance with the illustrative embodiment of the present invention. In FIG. 9A, screen shot 901 represents the default screen as displayed by video display 304. When terminal 201 receives from content server 207 the second message where a portion of which represents a full screen of text and graphics, terminal 201 determines, based on state and so forth, whether or not to output the full screen of content. Screen shot 902, which is depicted in FIG. 8B, represents a screen in which full-screen content 903 has been output to video display 304 as part of task 707.

Figure 10:
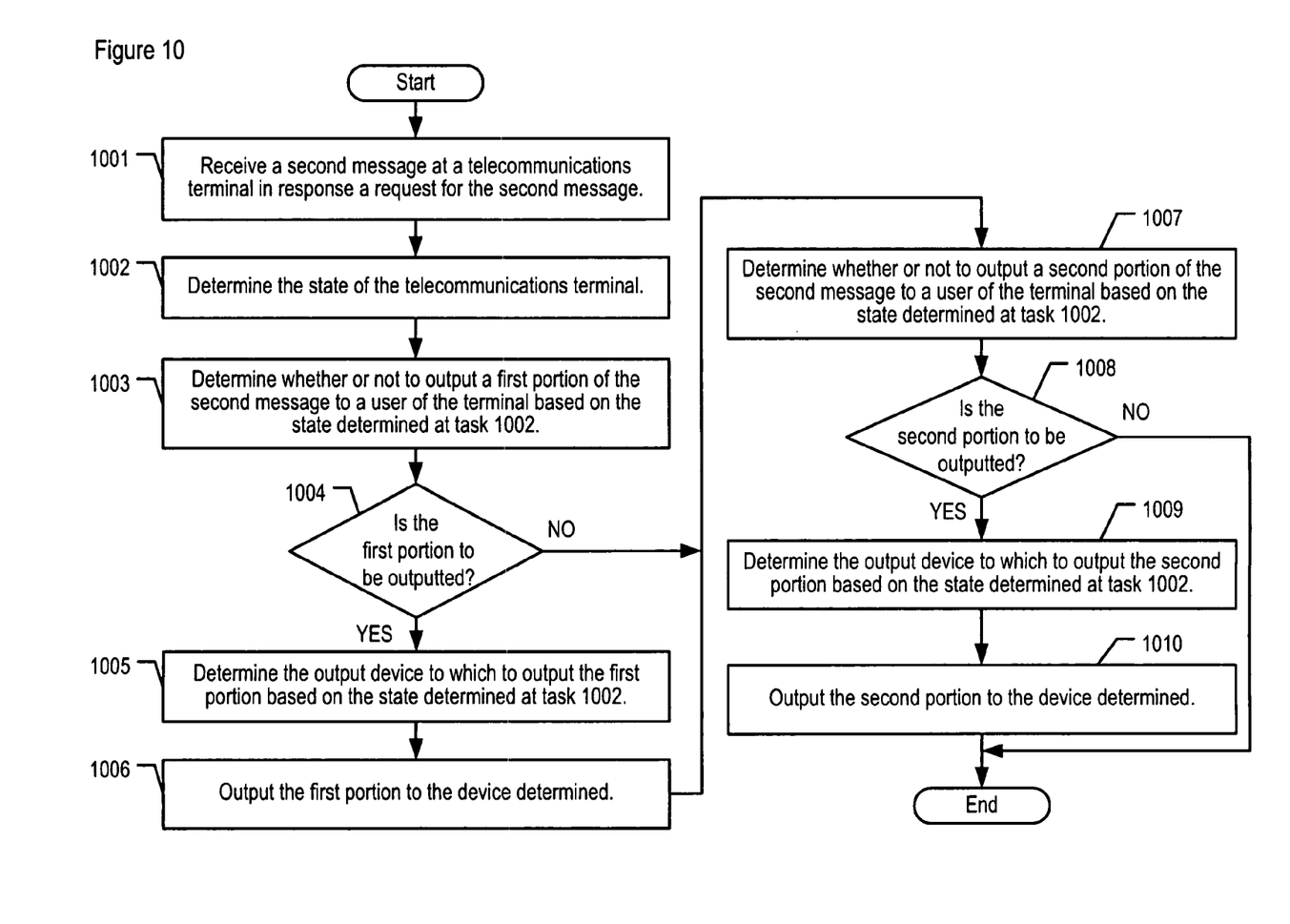
FIG. 10 depicts a flowchart of the salient tasks associated with determining whether or not to output multiple portions of a received second message, in accordance with the illustrative embodiment of the present invention.

FIG. 10 depicts a flowchart of the salient tasks associated with determining whether or not to output multiple portions of a received second message, in accordance with the illustrative embodiment of the present invention. Terminal 201 is capable of determining whether or not to output the first portion and of determining whether or not to output the second portion independently of each other. It will be clear to those skilled in the art which tasks depicted in FIG. 10 can occur simultaneously or in a different order than that depicted.

At task 1001, terminal 201 receives a second message from content server 207. The second message comprises two segments of content or other information that is requested by terminal 201 by using a first address provided by message initiator 206. Content can be one or more of single-line text, full-screen text, text and graphics, audio, a second address (e.g., of a subscription server such as server 208, etc.), and so forth. Each segment of content in the second message can be different from or the same as the other segment.

At task 1002, terminal 201 determines its state. The state of terminal 201 is determined by, but is not limited to, user-driven states, data states, and call states. It will be clear to those skilled in the art how to determine the state of terminal 201.

At task 1003, terminal 201 determines whether or not to output the first portion of received content to the user of terminal 201 based on the state determined at task 1002, in accordance with the illustrative embodiment. The current state of terminal 201 (i.e., determined at task 1002) is considered instead of the state determined earlier (i.e., at task 604) because the terminal's state might have changed in the interim. Terminal 201 also bases the decision to output the first portion on the priority and the type of the content, in accordance with the illustrative embodiment. Priority and type, along with examples, are described above and with respect to tasks 604 and 605.

In some alternative embodiments, terminal 201 bases the decision to output the first portion of received content to the user on a subset of terminal state, content priority, and content type.

At task 1004, if terminal 201 determines not to output the first portion, task execution proceeds to 1007. If terminal 201 determines that it will output the first portion, execution proceeds to task 1005.

At task 1005, terminal 201 optionally determines the output device to which to output the received first portion of content. For example, terminal 201 might direct an audio stream to handset speaker 305 and console speaker 306 if the content is of high priority (e.g., a priority associated with an emergency situation, etc.) or to handset speaker 305 if the content is of normal priority and the handset is off-hook (but the user is not yet on a call).

At task 1006, terminal 201 outputs the first portion of content to the specified or selected device or devices.

At task 1007, terminal 201 determines whether or not to output the second portion of received content to the user of terminal 201 based on the state determined at task 1002, in accordance with the illustrative embodiment. Terminal 201 also bases the decision to output the second portion on the priority and the type of the content, in accordance with the illustrative embodiment. Priority and type, along with examples, are described above and with respect to tasks 604 and 605.

In some alternative embodiments, terminal 201 bases the decision to output the second portion of received content to the user on a subset of terminal state, content priority, and content type.

At task 1008, if terminal 201 determines not to output the second portion, task execution ends. If terminal 201 determines that it will output the second portion, execution proceeds to task 1009.

At task 1009, terminal 201 optionally determines the output device to which to output the received second portion of content.

At task 1010, terminal 201 outputs the second portion of content to the specified or selected device or devices. After task 1010, task execution ends.

In some embodiments of the present invention, both portions of the second message are intended to be outputted together to the user of terminal 201. For example, the first portion might be a full screen of text and graphics, and the second portion might be an audio stream that describes how to use the screen to select items. In some other embodiments of the present invention, either the first portion or the second portion, but not both portions, is intended to be outputted to the user of terminal 201. For example, the first portion might be an audio stream of normal priority, which can be outputted if a call is not in progress, while the second portion might be text, which is outputted instead of the audio stream under certain conditions (e.g., while a call is in progress, etc.). As another example, the first portion might represent a full screen of text and graphics, and is displayed whenever possible, while the second portion might represent a single line of text that is displayed when terminal 201 determines not to output the full screen portion.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (1) receiving, by a telecommunications terminal, a first message transmitted from a first source, wherein:
      a. the first source initiated the transmission of the first message without communicating with a second source,
      b. the first message is an unsolicited message, and
      c. the first message instructs the telecommunications terminal to request a second message from an address specified in the first message;
   (2) transmitting, by the telecommunications terminal, a request to the second source based on the address specified in the first message, wherein:
      a. the request is transmitted when, and only when, the trustworthiness of the address specified in the first message can be verified by the telecommunications terminal, and
      b. the first source and the second source are different sources;
   (3) receiving, by the telecommunications terminal, the second message in response to the request transmitted to the second source;
   (4) determining, by the telecommunications terminal, a call state of the telecommunications terminal after receiving the second message;
   (5) wherein the telecommunications terminal performs at least one of the following tasks based on the type of content contained within the second message:
      a. output content contained within the second message to a user at the telecommunications terminal based on the call state, and
      b. transmit a third message to a third source based on a second address specified in the second message;
   (0.5) receiving, by the telecommunications terminal, a list of valid addresses from a fourth source, wherein:
      a. the list valid of addresses is received by the telecommunications terminal prior to receiving the first message from the first source, and
      b. the first source, the second source, the third source, and the fourth source are different sources.

2. The method of claim 1 wherein the list of valid addresses is received by the telecommunications terminal in response to a boot-up signal transmitted by the telecommunications terminal to the fourth server.

3. The method of claim 1 wherein verifying the trustworthiness of the address specified in the first message is based on comparing the address with the list of valid addresses.

4. The method of claim 1 wherein verifying the trustworthiness of the address specified in the first message is based on comparing:
   a. the address specified in the first message with the list of valid addresses, and
   b. an address of the first source with the list of valid addresses.

5. The method of claim 1 wherein outputting the content contained within the second message is also based on whether the content includes at least one of text and audio.

6. The method of claim 1 wherein outputting the content contained within the second message further comprises determining, by the telecommunications terminal, a priority of the content; and
   wherein outputting the content contained within the second message is also based on the priority of the content.

7. The method of claim 1 wherein outputting the content contained within the second message further comprises determining, by the telecommunications terminal, an output device to output the content based on the call state of the telecommunications terminal as determined at task (4).

8. The method of claim 1 further comprising:
   (1.5) determining, by the telecommunications terminal, the call state of the telecommunications terminal before transmitting the request to the second source, wherein the request is transmitted by the telecommunications terminal:
      a. when the trustworthiness of the address specified in the first message can be verified by the telecommunications terminal, and
      b. based on the call state of the telecommunications terminal as determined at task (1.5).

9. A method comprising:
   (1) receiving, by a telecommunications terminal, a first message transmitted from a first source, wherein:
      a. the first source initiated the transmission of the first message without communicating with a second source,
      b. the first message is an unsolicited message, and
      c. the first message instructs the telecommunications terminal to request a second message from a first address specified in the first message;
   (2) transmitting, by the telecommunications terminal, a request to the second source based on the first address specified in the first message, wherein the request is transmitted when, and only when, the trustworthiness of the first address specified in the first message can be verified by the telecommunications terminal;
   (3) receiving, by the telecommunications terminal, the second message in response to the request transmitted to the second source, wherein the second message instructs the telecommunications terminal to transmit a third message to a second address specified in the second message;
   (4) transmitting, by the telecommunications terminal, the third message to a third source based on the second address specified in the second message, wherein the third message is transmitted when, and only when, the trustworthiness of the second address specified in the second message can be verified by the telecommunications terminal; and (0.5) receiving, by the telecommunications terminal, a first list of addresses from a fourth source, wherein:
- a. the first list of addresses is received by the telecommunications terminal prior to receiving the first message from the first source, and
- b. the first source, the second source, the third source, and the fourth source are different sources.

10. The method of claim 9 wherein the first source and the second source are different sources.

11. The method of claim 9 wherein the first list comprises one or more valid addresses, and wherein the first list of addresses is transmitted from the fourth source to the telecommunications terminal in response to a boot-up signal transmitted from the telecommunications terminal transmitting.

12. The method of claim 9 wherein the task of (0.5) further comprises:
receiving, by the telecommunications terminal, a second list of address from the fourth source, wherein the second list of addresses are received by the telecommunications terminal prior to receiving the first message from the first source.

13. The method of claim 12 wherein:
a. the first list of addresses is indicative of trusted sources of a first type,
b. the second list of addresses is indicative of trusted sources of a second type, and
c. the trusted sources of the first type and the trusted sources of the second type are different types of sources.

14. The method of claim 9 further comprising:
(1.5) determining, by the telecommunications terminal, a call state of the telecommunications terminal before transmitting the request to the second source, wherein:
- a. the request is transmitted to the second source when, and only when, the telecommunications terminal accepts the first message based on the call state as determined at task (1.5), and
- b. transmits a fourth message to the first source when the telecommunications terminal rejects the first message based on the call state as determined at task (1.5).

* * * * *